United States Patent
Komine et al.

(10) Patent No.: US 9,555,514 B2
(45) Date of Patent: Jan. 31, 2017

(54) WORKPIECE DISCHARGE DEVICE FOR MACHINE TOOL

(71) Applicant: DMG MORI CO., LTD., Nara (JP)

(72) Inventors: Kento Komine, Nara (JP); Katsuhito Miyahara, Nara (JP); Tatsuhiko Kuriya, Nara (JP)

(73) Assignee: DMG MORI CO., LTD., Yamatokoriyama-shi, Nara (JP)

( * ) Notice: Subject to any disclaimer, the term of this patent is extended or adjusted under 35 U.S.C. 154(b) by 0 days.

(21) Appl. No.: 15/016,820

(22) Filed: Feb. 5, 2016

(65) Prior Publication Data

US 2016/0229013 A1   Aug. 11, 2016

(30) Foreign Application Priority Data

Feb. 9, 2015   (JP) ................................ 2015-023329

(51) Int. Cl.
*B23Q 7/08*   (2006.01)
*B23Q 7/10*   (2006.01)

(52) U.S. Cl.
CPC ........... *B23Q 7/08* (2013.01); *B23Q 2707/003* (2013.01)

(58) Field of Classification Search
CPC ............. B23Q 7/08; B23Q 7/10; B23Q 7/045; B23Q 7/04; B23Q 7/12; B23Q 39/04; B23Q 39/046
See application file for complete search history.

(56) References Cited

U.S. PATENT DOCUMENTS

| 3,024,677 | A | * | 3/1962 | Greiman | B21H 3/08 411/427 |
|---|---|---|---|---|---|
| 4,597,155 | A | * | 7/1986 | Garnett | B23Q 7/045 29/36 |
| 5,768,931 | A | * | 6/1998 | Gombas | B23Q 39/044 72/184 |
| 8,074,543 | B2 | * | 12/2011 | Hyatt | B24B 5/02 29/27 C |
| 2004/0060402 | A1 | * | 4/2004 | Shimada | B23B 13/126 82/124 |
| 2013/0232779 | A1 | * | 9/2013 | Mori | B23Q 7/04 29/791 |

FOREIGN PATENT DOCUMENTS

| JP | 05040903 A | * | 2/1995 | ............... B23Q 7/08 |
| JP | 09174302 A | * | 7/1997 | ............... B23Q 7/08 |
| JP | 2005-40903 A |   | 2/2005 | |

* cited by examiner

*Primary Examiner* — Will Fridie, Jr.
(74) *Attorney, Agent, or Firm* — IP Business Solutions, LLC

(57) ABSTRACT

A workpiece discharge device for a machine tool is provided with a container, which is mounted on a turret and receives a workpiece held by a spindle from a receiving port, and a storage box, which stores the workpiece inside the container by using a revolution of the turret and passing through a chute. The container is mounted on the turret and is capable of swinging around a swinging shaft which is parallel to a revolving axis of the turret, and the receiving port is arranged to direct vertically upward in a predetermined indexing angle range of the container when the workpiece is received.

6 Claims, 6 Drawing Sheets

WORKPIECE DISCHARGE DEVICE FOR MACHINE TOOL

CROSS-REFERENCE TO RELATED APPLICATIONS

The present application claims priority under 35 U.S.C. 119 to Japanese Patent Application No. 2015-023329, filed on Feb. 9, 2015, the contents of which is incorporated herein by reference in its entirety.

BACKGROUND OF THE INVENTION

Field of the Invention

The present invention relates to a workpiece discharge device for a machine tool which discharges a machined workpiece from the inside of the machine to the outside of the machine.

Description of the Related Art

As this kind of discharge device, for example, the following structure is disclosed by Japanese Unexamined Patent Application Publication No. 2005-40903. A container 6 mounted on a turret 1 is rotatably supported by a pinion shaft 7 in a position between a standby position (discharge position) and a receiving position, and the turret 1 is moved in a X-axis direction and a rack shaft 9 is pushed by contacting a workpiece W. With such rotation of the pinion shaft 7, the container 6 is revolved from the standby position to the receiving position to receive the workpiece W. By further moving the turret 1 in the X-axis direction, the container 6 is revolved in a reverse direction to discharge the workpiece W by rotating a lever 10, and the workpiece W is discharged outside the machine through a workpiece duct 35 by moving the turret 1 in the Z-axis direction (see paragraphs [0022], [0023], and FIGS. 1 and 2 of Japanese Unexamined Patent Application Publication No. 2005-40903).

In the conventional device, the workpiece is discharged by revolving the turret and moving the turret in the X-axis direction and the Z-axis direction. Therefore, the structure and these operations easily become complicated, and also, it has a problem of an increase in cost.

Further, the structure in which the container is supported by a ball stopper in each of the receiving position and the discharge position is employed, and therefore, the holding force is not sufficient. It is concerned that for example, when the workpiece is large in size or heavy in weight, it may be difficult to receive and discharge the workpiece.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the conventional status noted above, and an object is to provide a workpiece discharge device for a machine tool which is capable of surely discharging a workpiece, and to simplify the structure of the workpiece discharge device and the discharge operations.

In some embodiments of the present disclosure, in a machine tool machining a workpiece held by a rotatable spindle by operating a tool mounted on a turret which is arranged to be capable of being revolved and indexed, a workpiece discharge device is provided with a container which is mounted on the turret and receives the workpiece held by the spindle from a receiving port, and a storage box which stores the workpiece inside the container by using a revolution of the turret and passing the workpiece through a chute. The container is mounted on the turret and is capable of swinging around a swinging shaft which is parallel to a revolving axis of the turret, and the receiving port is arranged to direct vertically upward in a predetermined indexing angle range of the container when the workpiece is received.

In some embodiments of the present disclosure, in the workpiece discharge device for the machine tool as recited above, a chute guiding the workpiece to the storage box is provided to be movable back and forth between a downward position of the container which is revolved in a discharge position and a standby position inside the storage box which is arranged outside the machine.

In some embodiments of the present disclosure, in the workpiece discharge device for the machine tool as recited above, it is provided with a switching mechanism which is capable of switching between a swinging state in which the container enables to swing around the swinging shaft and a fixed state in which the receiving port of the container is fixed to direct radially outward the turret.

In some embodiments of the present disclosure, in the workpiece discharge device for the machine tool as recited above, the container swings around the swinging shaft by moving the chute to a downward position of the container.

According to some embodiments as recited above, the container mounted on the turret is capable of swinging around the swinging shaft which is parallel to a revolving axis of the turret, and the receiving port of the container is relatively and rotatably arranged to direct vertically upward with respect to the turret, and therefore, the workpiece held by the spindle upward the turret can be surely received by the container.

Further, with the revolution of the turret, when the container moves to the workpiece discharge position in a state in which the receiving port directs vertically upward, with a simple structure, the container can be rotated in a manner in which the receiving port directs downward, so that the workpiece can be stored in the storage box. With this, the limitations of shapes and sizes of the container or the workpiece are suppressed and it becomes possible to surely discharge the workpiece.

According to some embodiments as recited above, a chute is movable back and forth between the discharge position downward the container and the standby position outside the machine, and therefore, at the time of machining the workpiece, by standing by the chute outside the machine, the chute does not interfere at the time of machining.

According to some embodiments as recited above, it is capable of switching between a swinging state in which the container enables to swing around the swinging shaft and a fixed state in which the receiving port of the container is fixed in a manner of directing radially outward the turret. Therefore, the receiving port always directs radially outward by switching the container in the fixed state while machining, so that the accumulation of chips entering inside the container can be suppressed and the workpiece can be surely received.

Further, at the time of discharging the workpiece when the machining ends, as described above, by switching the container in the swinging state, the workpiece can be surely discharged from the container which is revolved to the discharge position.

According to some embodiments as recited above, the container swings around the swinging shaft by the movement of the chute. Therefore, the container can swing in the workpiece discharge angle by the chute. With this point, the workpiece discharge structure and operations can be simplified.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

Figure 1:
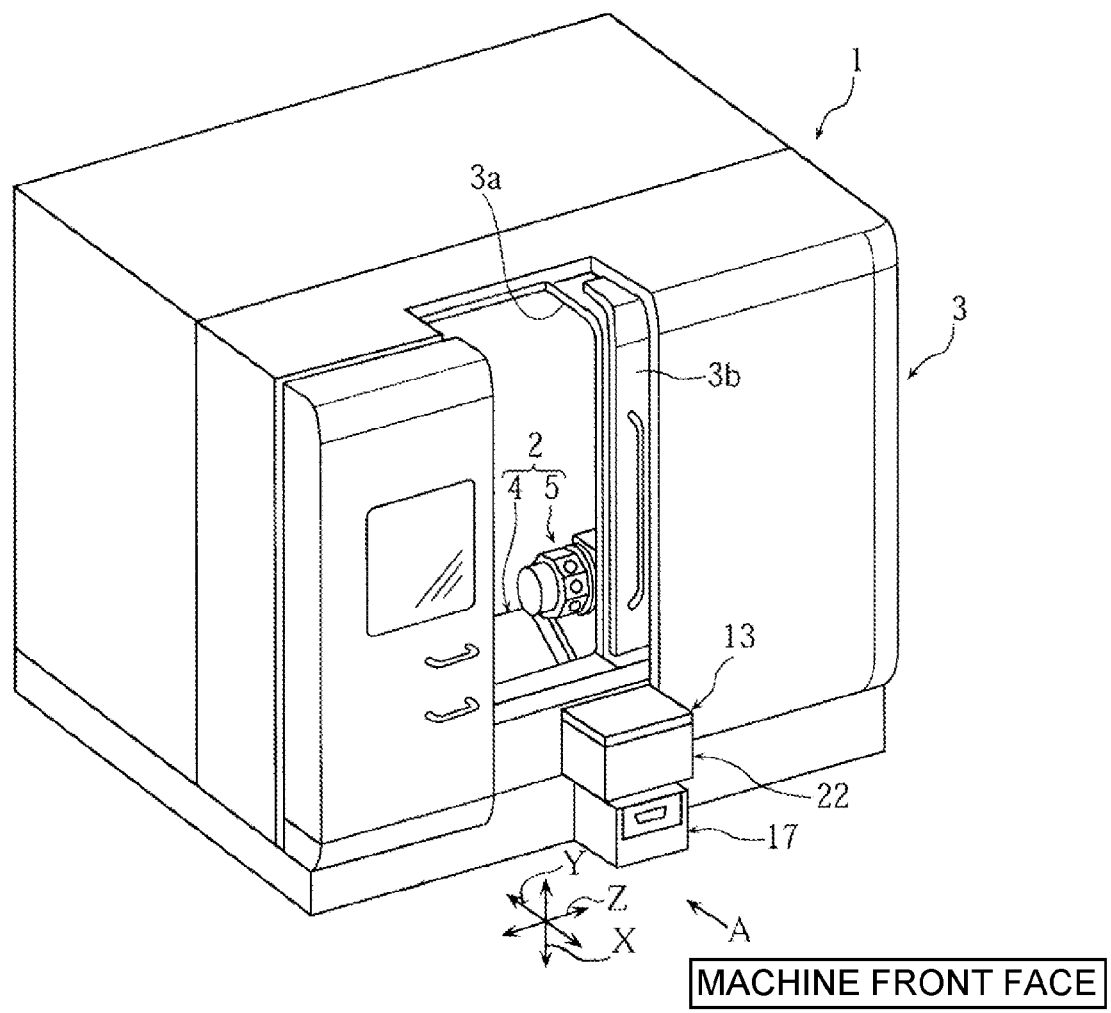
FIG. 1 is a perspective view of a machine tool including a discharge device according to embodiment 1 of the present invention.
Figure 2:
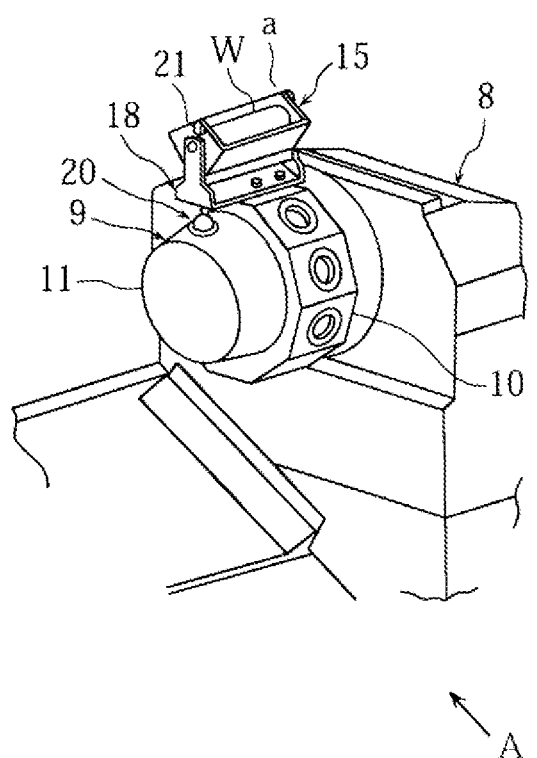
FIG. 2 is a perspective view of a turret arranged with the discharge device.

In the following paragraphs, some embodiments of the invention will be described by way of example and not limitation. It should be understood based on this disclosure that various other modifications can be made by those in the art based on these illustrated embodiments.

Hereinafter, the embodiment of the present invention will be described in reference to the drawings.

Embodiment 1

FIGS. 1 to 6 are the drawings to describe a discharge device for a machine tool according to embodiment 1 of the present invention. In the present embodiment, the indications "front", "rear", "left" and "right" mean the front, rear, left and right of the machine when viewed from the machine front face.

In the drawings, reference numeral 1 denotes a composite lathe. The composite lathe 1 is provided with a headstock (not shown) in each end side of right and left of a bed 4 when viewed from the machine front face A, a lathe main body 2 arranging a tool rest 5 which is located between the right and left headstocks and is movable in the X-axis direction and the Z-axis direction, and a machine body cover 3 surrounding the outer periphery of the lathe main body 2.

In the machine front face of the machine body cover 3, a wide opening for operation 3a is formed, and the opening 3a is capable of being opened and closed by a sliding door 3b.

Figure 3:
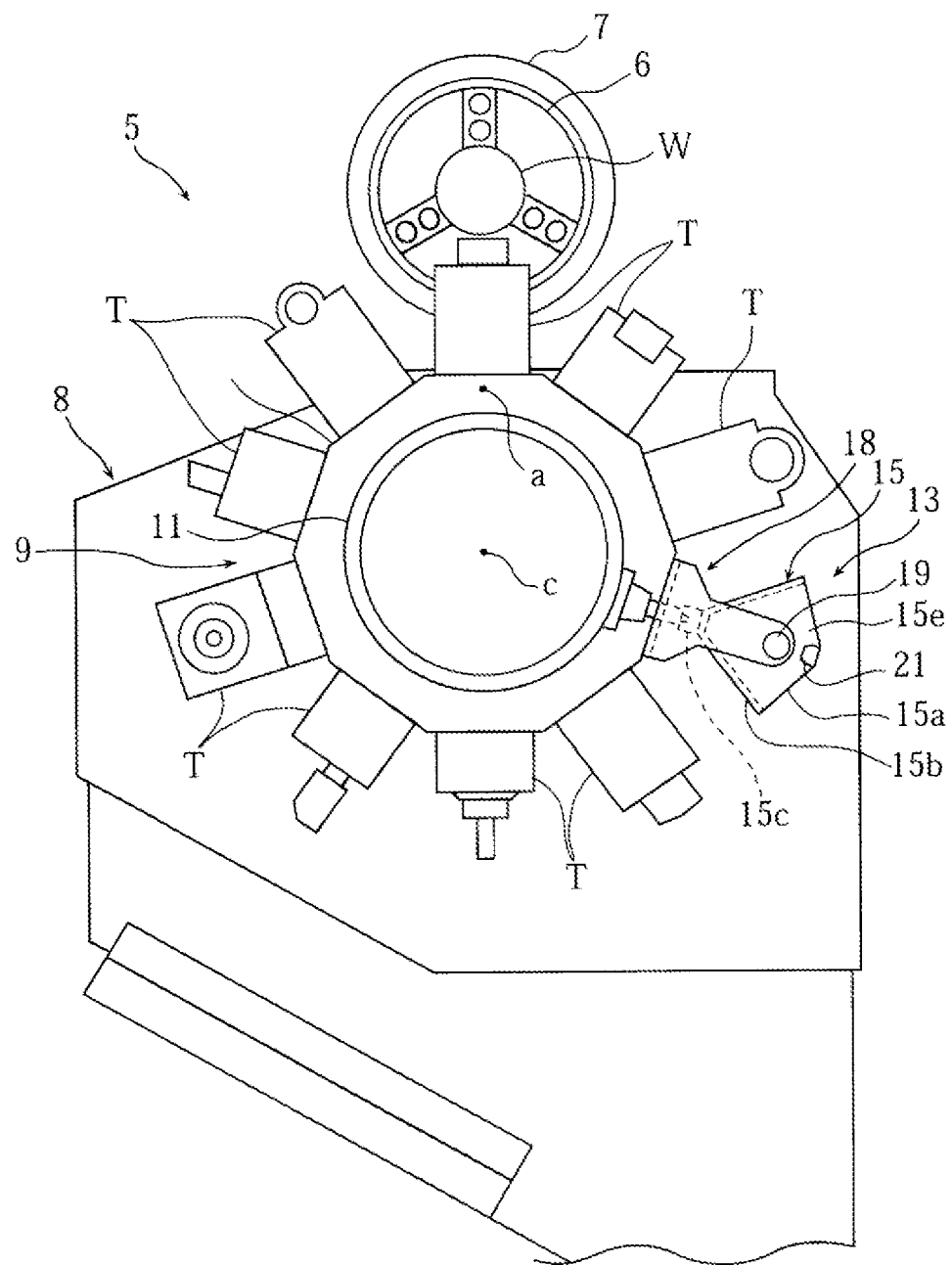
FIG. 3 is a left-side view of the turret.
Figure 4:
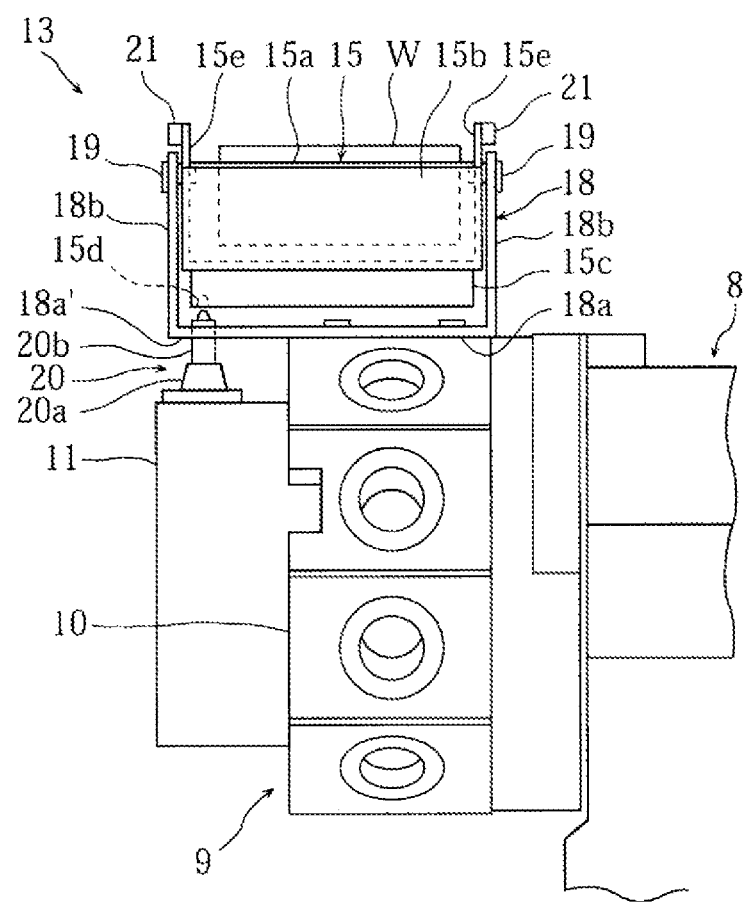
FIG. 4 is a front view of the turret.

The headstock has a structure rotatably supporting a spindle 7 which is provided with a chuck 6 holding a workpiece W (see FIG. 3). The spindle 7 is rotatably driven by a driving motor (not shown).

The tool rest 5 is provided with a tool rest main body 8 which is movably supported by the bed 4, and a turret 9 mounted on the tool rest main body 8. The turret 9 has a structure supporting a turret head 10, which is provided with a plurality of tools T mounted in a predetermined interval in the outer periphery and is capable of being revolved and indexed by a revolving and indexing head 11, and a predetermined tool T is rotationally indexed and positioned in a vertically upward machining position (workpiece receiving position) a and it is clamped at the machining position a.

The composite lathe 1 has a structure applying a predetermined machining to the workpiece W, which is held by the chuck 6 of the spindle 7, by operating any of the tools T mounted on the turret 9.

The composite lathe 1 is provided with a workpiece discharge device 13 discharging the machined workpiece W to the outside of the machine. The discharge device 13 is provided with a container 15 arranged on the turret 9 and receiving the machined workpiece W, which is held by the chuck 6, at the workpiece receiving position a, which is the machining position. The discharge device 13 is also provided with a storage box 17 storing the workpiece W inside the container 15 which is revolved to the workpiece discharge position b by using the revolution of the turret head 10 and is passed through the chute 16.

The container 15 has a structure forming a weight part 15*c* in a bottom part of a container main body 15*b* which has a receiving port 15*a* and forms approximately V-shape in a cross-sectional view. The support bracket 18 is provided with right and left longitudinal plate parts 18*b*, 18*b*, which are raised and formed in a bottom plate part 18*a*, so as to be formed as an upward U-shape in a front view, and the bottom plate part 18*a* is clamped and fixed to the turret head 10 with a bolt.

In the right and left longitudinal plate part 18*b* of the support bracket 18, the container 15 is supported and capable of swinging back and forth in the machine front face A through swinging shafts 19, 19 having a swinging axis line which is parallel to a revolving spindle center C of the turret head 10.

With this, the container 15 is arranged to relatively rotate with respect to the turret 9, so that the receiving port 15*a* of the container 15 always directs vertically upward in a predetermined indexing angular range of the turret 9.

The revolving and indexing head 11 of the turret 9 is provided with a switching mechanism 20 switching between a swinging state, in which the container 15 enables to swing around the swinging shafts 19, and a fixed state, in which the container 15 is fixed in a manner where the receiving port 15*a* of the container 15 directs radially outward the turret head 10. In detail, a part of the bottom plate part 18*a* of the support bracket 18 projects in a manner of facing the revolving and indexing head 11 side, and the switching mechanism 20 is arranged under the projecting part 18*a*' of the bottom plate part 18*a* (see FIG. 4).

The switching mechanism 20 is provided with an energizing spring (not shown) movably inserting a lock pin 20*b* to a cylinder member 20*a*, which is fixed in the revolving and indexing head 11, in a vertical direction and always biasing the lock pin 20*b* in a locking direction. Further, the switching mechanism 20 is provided with a pressurizing chamber (not shown) pressurizing the lock pin 20*b* in an unlocking direction by compressed air. The lock pin 20*b* is engageable with a lock hole 15*d* formed in the weight part 15*c* of the container 15 by passing through the projecting part 18*a*' of the bottom plate part 18*a*.

At the time of machining the workpiece, the container 15 is locked by projecting the lock pin 20*b* and engaging with the lock hole 15*b* of the container 15, so that it does not swing. Further, at the time of discharging the workpiece as described later, the container 15 freely swings by retreating the lock pin 20*b*.

In the right and left side wall members 15*e*, 15*e* of the container main body 15*a* of the container 15, tip-shaped revolving regulation members 21, 21, which are capable of being engaged with the right and left longitudinal plate parts 18*b* of the support bracket 18, are arranged and fixed.

In the state in which the container 15 enables to swing, the positions, etc. at which the revolving regulation members 21 are mounted are configured to contact with the right and left longitudinal plate parts 18*b* of the support bracket 18 when the revolving angle of the turret head 11 reaches at a predetermined angle (approximately 100 to 110 degrees). From this state, when the turret head 11 is further revolved and the container 15 moves to the workpiece discharge position b, the container 15 is configured to incline the receiving port 15*a* of the container 15 toward the outside of the machine (see FIG. 5 and FIG. 6).

Figure 5:
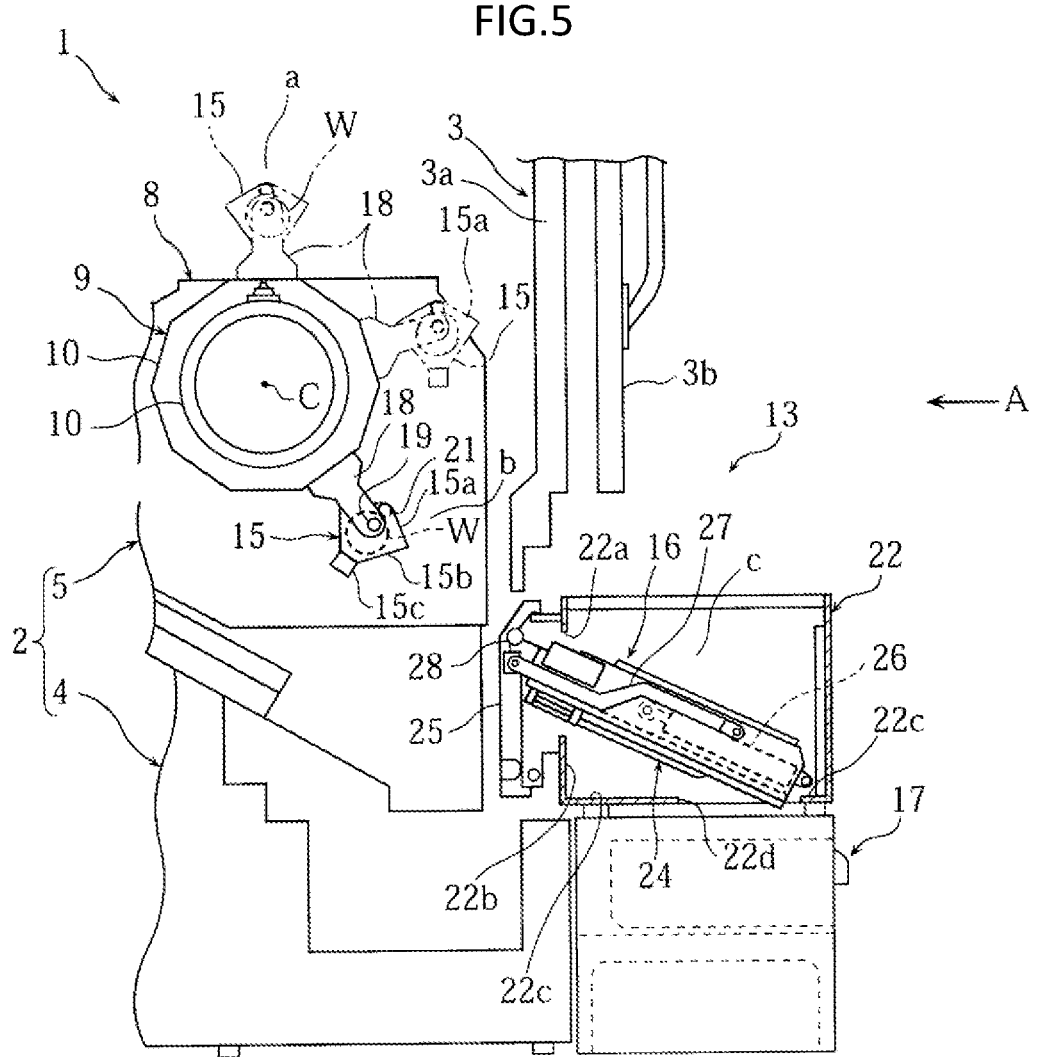
FIG. 5 is a left-side view indicating operations of the discharge device.
Figure 6:
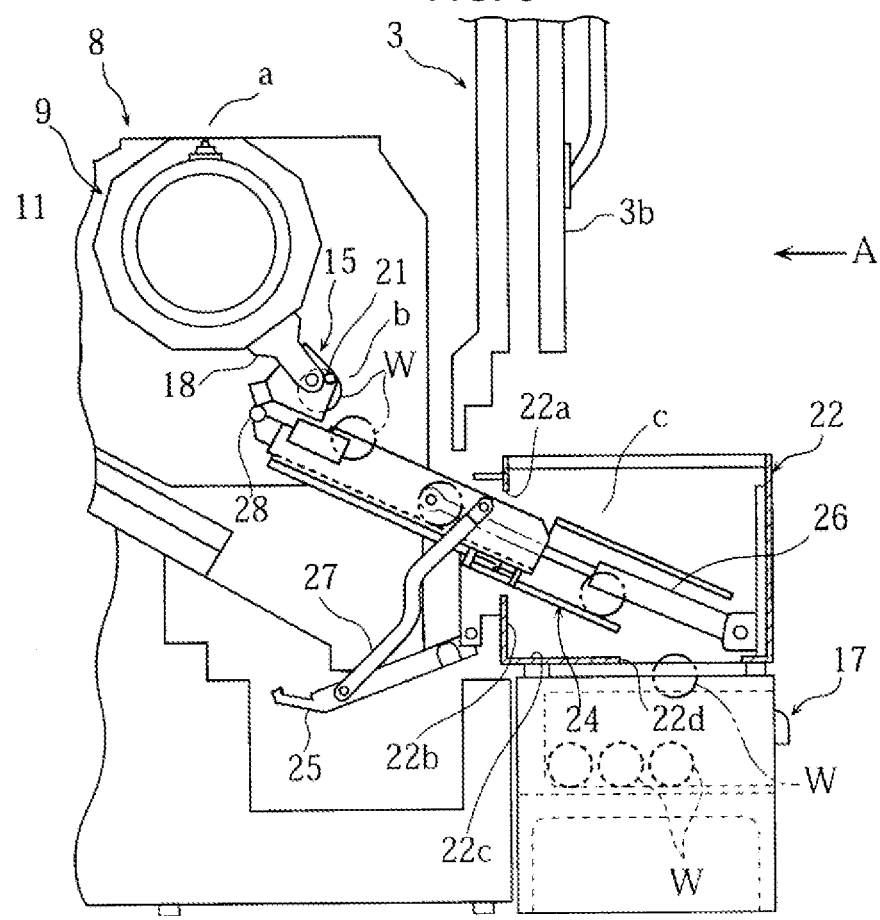
FIG. 6 is a left-side view indicating operations of the discharge device.

As shown in FIG. 5 and FIG. 6, the chute 16 is stored inside a case 22 mounted on the upper surface of the storage box 17, and the case 22 is arranged outside the machine at the opening 3*a* of the machine body cover 3. In a rear wall inside machine 22*b* of the case 22, a rear surface opening 22*a* communicating with the inside of the machine through the opening 3*a* of the cover 3 is formed, and in a bottom wall 22*c*, a communication opening 22*d* communicating with the storage box 17 is formed.

Further, in the rear wall 22*b* of the case 22, a lid member 25, which opens and closes the rear surface opening 22*a*, is rotatably mounted.

Inside the case 22, a guide member 24 directing the workpiece discharge position b is fixed and arranged in an inclined shape. The chute 16 is formed in a gutter shape and is supported to be movable back and forth between the workpiece discharge position b on the guide member 24 and the standby position c inside the case 22. Further, the chute 16 is driven to move back and forth by a pneumatic cylinder 26 which is arranged at an outer side of a side surface of the chute 16.

The chute 16 and the lid member 25 are connected by a link member 27. When the chute 16 stands by at the standby position c, the lid member 25 closes the rear surface opening 22*a*, and when the chute 16 moves, the lid member 25 sequentially rotates downward so as to open the rear surface opening 22*a*.

In a tip end part of the chute 16, a contact member 28, which is capable of contacting with the weight part 15*c* of the container 15, is mounted. When the contact member 28 contacts with the weight part 15*c* of the container 15 by moving the chute 16 into the inside of the machine, and when the chute 16 further moves, the container 15 is revolved around the swinging shafts 19 at the workpiece discharge position b. With this, the workpiece W is discharged from the receiving port 15*a* of the container 15 to the chute 16 and the workpiece W is stored in the storage box 17 from the chute 16 through the guide member 24.

The movement of the workpiece discharge device 13 will be described with reference to, mainly, FIGS. 5 and 6.

When the machining to the workpiece W held by the chuck 6 ends, the container 15 positions at the workpiece receiving position a by revolving the turret head 10. When the chuck 6 releases, the workpiece W is received in the container 15, and subsequently, the switching mechanism 20 switches the lock pin 20*b* to the unlock position. With this, the container 15 becomes in the swinging state in which the receiving port 15a of the container 15 always directs vertically upward.

When the container 15 reaches at a predetermined indexing angle by revolving the turret head 11 in a clockwise direction, the revolving regulation member 21 contacts with the support bracket 18, and further, when the turret head 11 revolves to the discharge position b, the container 15 inclines in a direction outside the machine.

Next, the chute 16 moves from the standby position c to inside the machine while opening the lid member 25, the contact member 28 contacts with the weight part 15c of the container 15 and the container 15 swings up to the angle which enables to discharge the workpiece. With this, the workpiece W inside the container 15 is discharged and stored inside the storage box 17 from the chute 16 through the guide member 24. After that, the chute 16 retreats to the standby position c and the lid member 25 is closed.

According to the present embodiment, the support bracket 18 supporting the container 15 is mounted on the turret head 10. The container 15 is supported so as to freely swing around the swinging shafts 19 which are pivotally supported in the support bracket 18. The revolving regulation members 21, 21 are provided in the container 15 so as to contact with the support bracket 18 when the container 15 reaches at a predetermined indexing angle. Therefore, when the container 15 moves to the workpiece discharge position b, the container 15 inclines in a manner in which the receiving port 15a of the container 15 directs outside the machine, so that it can facilitate to discharge the workpiece W. Regardless shapes, sizes, etc. of a workpiece, the workpiece W can be surely discharged, and eventually, it can save an operator's time and can improve work efficiency.

In the present embodiment, at the time of discharging the workpiece, the receiving port 15a is arranged so as to direct vertically upward based on a weight of the weight part 15c and a workpiece W until the container 15 reaches approximately the workpiece discharge position b. Therefore, the workpiece W can surely move to the discharge position in a stable condition. In addition, when the container which stores the workpiece is revolved in a fixed state to direct radially outward, the workpiece might jump out from the container. In the present embodiment, the container 15 directs upward, so that it can prevent the workpiece from jumping out.

In the present embodiment, it is capable of switching between the swinging state in which the container 15 enables to swing around the swinging shafts 19 and the fixed state in which the receiving port 15a of the container 15 is fixed to direct radially outward of the turret 9. Therefore, the receiving port 15a of the container 15, when empty, always directs radially outward by the state in which the container 15 is fixed while machining, so that the accumulation of chips entering inside the container 15 can be suppressed, and while machining, it can prevent the container 15 from swinging while revolving the turret 9. Moreover, at the time of discharging the workpiece W when the machining ends, by switching the container 15 in the swinging state, the workpiece W can be surely discharged.

In the present embodiment, the chute 16 is driven to move back and forth between the discharge position b set downward the container 15 and the standby position c outside the machine, and therefore, at the time of machining the workpiece, by standing by the chute 16 inside the case 22, it can prevent the chute 16 from interfering at the time of machining.

Further, the contact member 28 is provided at the tip end part of the chute 16, and the contact member 28 contacts with the container 15 by moving the chute 16 forward so as to swing the container around the swinging shafts 19. With this, the container 15 positions at an angle which enables to discharge the workpiece, and therefore, the workpiece W can be surely discharged by using the movement of the chute 16 without any special structure.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A workpiece discharge device for a machine tool wherein a workpiece held by a rotatable spindle is machined by operating a tool mounted on a turret, which is arranged to be capable of being revolved and indexed, comprising:
   a container being mounted on the turret and receiving the workpiece held by the spindle from a receiving port; and
   a storage box storing the workpiece inside the container by using a revolution of the turret and passing through a chute,
   wherein the container is mounted on the turret and is capable of swinging around a swinging shaft which is parallel to a revolving axis of the turret, and the receiving port is arranged to direct vertically upward in a predetermined indexing angle range of the container when the workpiece is received.

2. The workpiece discharge device for the machine tool according to claim 1, wherein the chute, which guides the workpiece to the storage box, is provided to be movable back and forth between a downward position of the container which is revolved in a discharge position and a standby position inside the storage box which is arranged outside the machine.

3. The workpiece discharge device for the machine tool according to claim 1, further comprising: a switching mechanism being capable of switching between a swinging state in which the container enables to swing around the swinging shaft and a fixed state in which the receiving port of the container is fixed to direct radially outward the turret.

4. The workpiece discharge device for the machine tool according to claim 2, further comprising: a switching mechanism being capable of switching between a swinging state in which the container enables to swing around the swinging shaft and a fixed state in which the receiving port of the container is fixed to direct radially outward the turret.

5. The workpiece discharge device for the machine tool according to claim 2, wherein the container swings around the swinging shaft by moving the chute to a downward position of the container.

6. The workpiece discharge device for the machine tool according to claim 3, wherein the container swings around the swinging shaft by moving the chute to a downward position of the container.

* * * * *